H. A. TEMPELAAR.
TEA DRYING APPARATUS.
APPLICATION FILED AUG. 28, 1920.

1,364,463.

Patented Jan. 4, 1921.
2 SHEETS—SHEET 1.

Inventor
H. A. Tempelaar
By Marks & Clerk
Attorney

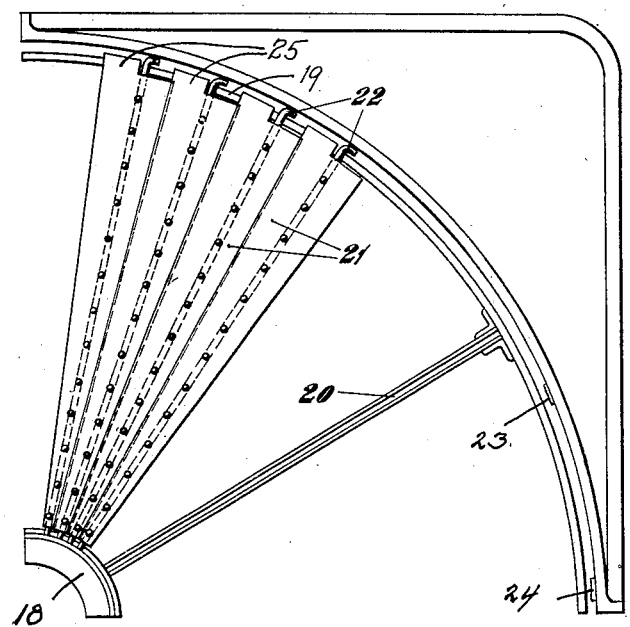

UNITED STATES PATENT OFFICE.

HENDRIK A. TEMPELAAR, OF TANDJONG-KARANG, SOUTH SUMATRA.

TEA-DRYING APPARATUS.

1,364,463.   Specification of Letters Patent.   Patented Jan. 4, 1921.

Application filed August 28, 1920. Serial No. 406,708.

*To all whom it may concern:*

Be it known that I, HENDRIK ARIE TEMPELAAR, mechanician, a subject of the Queen of the Netherlands, residing at Tandjong-Karang, South Sumatra, have invented certain new and useful Improvements in Tea-Drying Apparatus, of which the following is a specification.

This invention relates to so called stage-drying apparatus in which the material to be treated is arranged on perforated surfaces arranged one above the other and passes downwardly through the apparatus by being dropped from one stage on to the next, while a current of hot drying air is at the same time sent through the apparatus in the opposite direction.

This invention has for its object to adapt such apparatus in a simple manner for the purpose more especially of drying tea and similar material.

In the apparatus according to the invention disk-like sieve bearers are arranged around a central shaft, and alternately connected with this shaft or freely movable about it. In these sieve bearers, sector shaped sieve plates are so supported as to overlap each other at their border and to be pivoted about radial axes.

The sieve bearers are rotated alternately in opposite direction together with the sieves which preferably consist of perforated zinc sheets. This rotation is obtained for one group of sieve bearers by means of the shaft to which the disks are secured, for the other group by means of a special driving arrangement.

The sieve plates are each provided with a nose which during the rotation abuts against a fixed projection of the casing, by which abutment the plates are tipped at the corresponding spot. The material to be dried arranged on the tipping sector is removed therefrom and dropped on to the next sieve underneath. The sieve sector after having come past the abutment returns to its original position in which it is ready to receive less dry material from the next higher stage.

The accompanying drawings represent diagrammatically a form of apparatus according to the invention.

Figure 1:
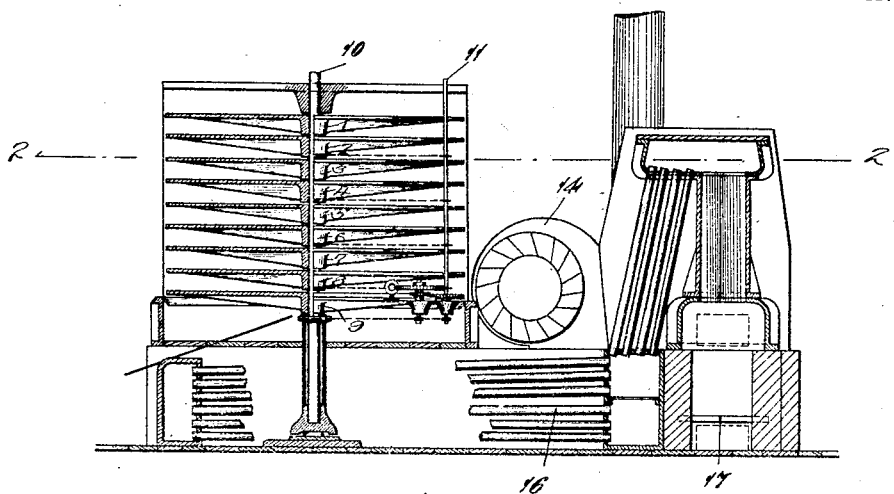
Figure 2:
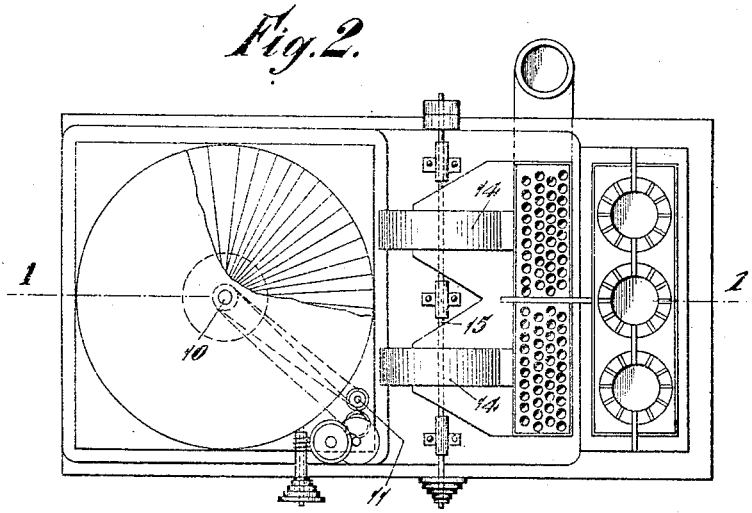

Figure 1 is a vertical section of the apparatus taken on line 1—1 of Fig. 2.

Fig. 2 a horizontal section along 2—2 in Fig. 1, and

Fig. 3 a detail plan view of a sieve bearer drawn to a larger scale.

Heating gases from the grate 17 are conducted through the heating pipes 16. The heating air is sucked from the atmosphere by two fans 14 provided on the shaft 15, and introduced, after being passed through the space around the heating pipes 16, into the lower part of the drying space within the casing in order to pass upwardly through the latter. The drying space contains a central shaft 10 and a plurality of circular sieve bearers 1—9, some of which (1, 3, 5, 7, 9) are connected to the shaft 10 so as to revolve therewith, while the others (2, 4, 6, 8) are freely rotatable about the shaft 10 and connected by means of driving chains with a vertical shaft 11 adapted to impart to the sieve bearers a motion in the direction opposite to the rotation of the shaft 10. The sieve bearers connected to the shaft 10 alternate with those which are freely movable about it. According to the present example, each sieve bearer consists of a central hub or ring 18 and a ring 19 connected to the hub by means of radial arms 20.

The sleeve plates 21 are in the shape of a circular sector. The plates are arranged between the rings 18 and 19 of the sieve bearer and pivoted about radial axes. Each of the plates of the sieve members 1, 3, 5, 7 and 9 is provided with a nose 22 which during the rotation abuts against a fixed projection 23 of the casing so that the sieve plate is tipped and the material lying thereon dropped on to the next lower stage. As soon as the nose 22 has come past the fixed projection the sieve plate returns to its original position in which it is ready to receive again less dry material from the next higher stage.

Each of the sieve members 2, 4, 6 and 8 is provided with a similar nose 22 which during rotation abuts against fixed projections 24 on the casing, so that the sieve plates of the latter members are also tipped at the proper time.

It will be noted that the rock shaft of each plate radially intersects the same at a point near to but at one side of its radial center line so that a portion of the plate at one side of the shaft is heavier than the portion on the other side of the shaft. In consequence the plates will automatically tip if no means are provided to maintain them in horizontal position. To prevent tipping, except at desired periods, the heavier portion of each plate is provided at its outer edge with an extension 25 which rests upon the ring 19.

Attention is called to the fact that the plates are arranged to have their edges overlap so that fine material, such as tea, will not pass between said plates when the latter are in their normal horizontal position.

From the foregoing it will be understood that warm air drawn in by the fans 14 will be forced upwardly through the casing containing the rotatable tables and that the warmest air will strike first the table 9 containing material which has been substantially completely dried and in consequence the heat from the warm air will not be entirely extracted until it reaches the top table 1 containing the material in its most moist condition. By the present construction it will be understood that maximum efficiency in heating exchange is produced.

Having now particularly described and ascertained the nature of my said invention and in what manner the same is to be performed, I declare that what I claim is:—

1. A drier including a casing designed to receive heated air at its lower end and to discharge the air at its upper end, a vertical shaft mounted in said casing and carrying a series of superposed tables which are fixed to said shaft, rotatable tables loosely mounted on the shaft between the tables which are fixed to the shaft, means for rotating the shaft and the fixed tables in one direction, means for moving the loosely mounted tables in the opposite direction, a series of segmental plates carried by each of said tables and having overlapping edges, and means for tipping each of said plates during rotation of said tables.

2. A drying apparatus including a casing designed to receive heated air at its lower end and to discharge said heated air at its upper end, a vertical shaft, located within the casing and carrying a series of superposed tables which are fixed to said shaft, tables located between the fixed tables and loosely mounted on said shaft, each of the loosely mounted tables being provided with means for rotating the same in a direction opposite to the direction of rotation of the tables which are fixed to the shaft, a series of segmental pivotally mounted plates carried by each of said tables and having overlapping edges, a nose-piece carried by each of said plates, and a fixed projection carried by the casing and engageable with said nose-pieces for tipping the plates during rotation of said tables.

3. In a drier, a rotatable table including an inner and outer ring, radially extending rock shafts fulcrumed in said rings, segmental plates fixed to said rock-shafts and the adjacent edges of said plates being overlapped, the rock shaft of each plate radially intersecting the same at a point near to but at one side of its radial center line, a projection extending outwardly from the plate at one side of its shaft and engaging the outer ring to normally maintain the plate in horizontal position, a nose provided on said shaft, and a fixed projection engageable with said nose for tipping the plate.

In testimony whereof I affix my signature.

H. A. TEMPELAAR.